(12) United States Patent
Jordan (10) Patent No.: US 11,204,667 B1
(45) Date of Patent: Dec. 21, 2021

(54) PROXIMITY SENSING WITH SOFT-SYNCHRONIZATION TO NOISE

(71) Applicant: Synaptics Incorporated, San Jose, CA (US)

(72) Inventor: Joel C. Jordan, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/039,419

(22) Filed: Sep. 30, 2020

(51) Int. Cl.
*G06F 3/041* (2006.01)
*G01D 5/24* (2006.01)
*G06F 3/044* (2006.01)

(52) U.S. Cl.
CPC .......... *G06F 3/04184* (2019.05); *G01D 5/24* (2013.01); *G06F 3/0446* (2019.05); *G06F 2203/04108* (2013.01); *G06F 2203/04112* (2013.01)

(58) Field of Classification Search
CPC .............. G06F 3/04184; G06F 3/0446; G06F 2203/04112; G06F 2203/041; G01D 5/24
See application file for complete search history.

(56) References Cited

U.S. PATENT DOCUMENTS

| | | | | |
|---|---|---|---|---|
| 2010/0214259 A1* | 8/2010 | Philipp | G06F 3/044 | 345/174 |
| 2011/0115729 A1* | 5/2011 | Kremin | G06F 3/04182 | 345/173 |
| 2011/0304585 A1* | 12/2011 | Chang | G01R 27/2605 | 345/174 |
| 2012/0249442 A1* | 10/2012 | Chang | G06F 3/04166 | 345/173 |
| 2013/0050130 A1* | 2/2013 | Brown | G06F 3/0446 | 345/174 |
| 2013/0106436 A1* | 5/2013 | Brunet | G06F 3/0445 | 324/613 |
| 2014/0168151 A1* | 6/2014 | Noguchi | G06F 3/04184 | 345/174 |
| 2014/0240259 A1* | 8/2014 | Park | G06F 3/0416 | 345/173 |
| 2015/0309616 A1* | 10/2015 | Stern | G06F 3/04182 | 345/174 |
| 2016/0092010 A1* | 3/2016 | Agarwal | G09G 5/12 | 345/173 |
| 2016/0231859 A1* | 8/2016 | Chen | G06F 3/04184 | |
| 2016/0357315 A1* | 12/2016 | Huang | G06F 3/04184 | |
| 2017/0131838 A1* | 5/2017 | Lu | G06F 3/0418 | |
| 2017/0285859 A1* | 10/2017 | Shepelev | G06F 3/0446 | |
| 2018/0046325 A1* | 2/2018 | Kim | G06F 3/0418 | |
| 2018/0217713 A1* | 8/2018 | Bye | G06F 3/04184 | |
| 2018/0349667 A1* | 12/2018 | Kim | G06K 9/0002 | |
| 2019/0294272 A1* | 9/2019 | Jo | G06F 3/0446 | |
| 2020/0318997 A1* | 10/2020 | Christ | H03K 17/962 | |

\* cited by examiner

*Primary Examiner* — Ibrahim A Khan
(74) *Attorney, Agent, or Firm* — Ferguson Braswell Fraser Kubasta PC (57) ABSTRACT

An input device includes a capacitive proximity sensor and a processing system. The capacitive proximity sensor includes a multitude of transmitter electrodes and a multitude of receiver electrodes for proximity sensing in a sensing region. The processing system is configured to obtain a noisy sensor signal from the capacitive proximity sensor, extract a spike train in the noisy sensor signal, synchronize a pulse output of a pulse-generating circuit onto the spike train, and triggered by a first of a multitude of pulses of the pulse output, perform a first capacitive proximity sensing.

18 Claims, 7 Drawing Sheets

PROXIMITY SENSING WITH SOFT-SYNCHRONIZATION TO NOISE

TECHNICAL FIELD

The described embodiments relate generally to electronic devices, and more specifically, to proximity sensing devices such as touch screens.

BACKGROUND

Input devices including proximity sensor devices (e.g., touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are often combined with display devices to operate as input-display devices (such as touch screens).

In an input device, the proximity sensing may be affected by noise, such as noise emitted by a display device, by a power supply, by a charger, etc. The noise affects the proximity sensor devices' ability to accurately detect the presence, location, and/or motion of input objects. Specifically, the noise in the signal obscures the amount of signal that is due to the input object.

SUMMARY

In general, in one aspect, one or more embodiments relate to an input device, comprising: a capacitive proximity sensor comprising a plurality of transmitter electrodes and a plurality of receiver electrodes for proximity sensing in a sensing region; a processing system configured to: obtain a noisy sensor signal from the capacitive proximity sensor; extract a spike train in the noisy sensor signal; synchronize a pulse output of a pulse-generating circuit onto the spike train; and triggered by a first of a plurality of pulses of the pulse output, perform a first capacitive proximity sensing.

In general, in one aspect, one or more embodiments relate to a processing system, comprising: circuitry configured to: obtain a noisy sensor signal from a capacitive proximity sensor interfacing with the circuitry of the processing system, wherein the capacitive proximity sensor comprises a plurality of transmitter electrodes and a plurality of receiver electrodes for proximity sensing in a sensing region; extract a spike train in the noisy sensor signal; synchronize a pulse output of a pulse-generating circuit onto the spike train; and triggered by a first of a plurality of pulses of the pulse output, perform a first capacitive proximity sensing.

In general, in one aspect, one or more embodiments relate to a method of operating an input device, comprising: obtaining a noisy sensor signal from a capacitive proximity sensor; isolating a spike train in the rectified noisy sensor signal; synchronizing a pulse output of a pulse-generating circuit onto the spike train; and triggered by a first of a plurality of pulses of the pulse output, performing a first capacitive proximity sensing.

Other aspects of the embodiments will be apparent from the following description and the appended claims.

DETAILED DESCRIPTION

The following detailed description is merely exemplary in nature, and is not intended to limit the disclosed technology or the application and uses of the disclosed technology. Furthermore, there is no intention to be bound by any expressed or implied theory presented in the preceding technical field, background, or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present disclosure provide input devices and methods for input devices that perform a soft-synchronization to noise. The noise may have certain known characteristics. For example, emissions of the noise may be correlated with the driving of a display device. In one specific example, pixels of the display device are driven line-by-line. With the driving of each line, there may be a period of higher amplitude noise emissions, and a period of lower amplitude noise emissions, whereby the higher amplitude noise emissions are higher than the lower amplitude noise emissions. A synchronization of the proximity sensing to the driving of the display device may thus allow sensing operations to be performed during the time intervals with lower amplitude noise emissions, while avoiding the time intervals with the higher amplitude noise emissions.

Frequently, a display device does not provide a synchronization output that would directly enable the synchronization of the proximity sensing to the driving of the display device. To enable the synchronization in absence of the synchronization output, in one or more embodiments, a soft-synchronization is performed. In the soft-synchronization, the input device obtains a noisy sensor signal and processes the noisy sensor signal to generate a spike train that is synchronized with the noise emissions of the display device. The spike train may subsequently be used to control the timing of the proximity sensing to at least partially avoid a temporal overlap of the proximity sensing with the higher amplitude noise emissions. A similar approach may be used to address noise originating from other noise sources, such as power supplies, battery chargers, etc.

Figure 1:
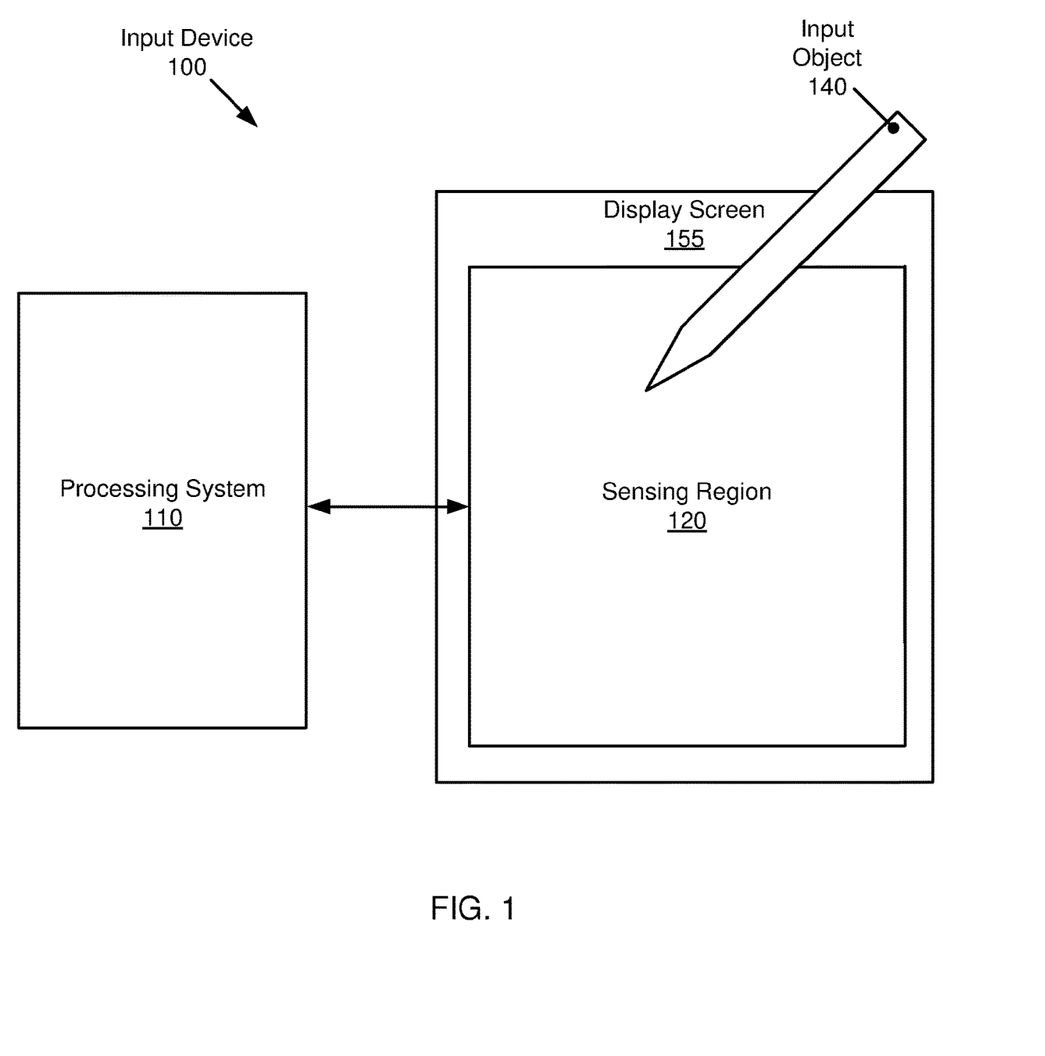
FIG. 1 shows a block diagram of an input device, in accordance with one or more embodiments.

FIG. 1 is a block diagram of an example of an input device (100), in accordance with one or more embodiments. The input device (100) may be configured to provide input to an electronic system (not shown). As used in this document, the term "electronic system" (or "electronic device") broadly refers to any system capable of electronically processing information. Some non-limiting examples of electronic systems include personal computers, such as desktop computers, laptop computers, netbook computers, tablets, web browsers, e-book readers, smart phones, personal digital assistants (PDAs), automotive infotainment devices, gaming devices, etc.

In FIG. 1, the input device (100) includes a proximity and/or force sensor device (e.g., "touchpad" or a "touch sensor device") configured to sense input provided by one or more input objects (140) in a sensing region (120). Example input objects include styli, an active pen, and fingers.

The sensing region (120) encompasses any space above, around, in and/or near the input device (100) in which the input device (100) is able to detect user input (e.g., user input provided by one or more input objects). The sizes, shapes, and locations of particular sensing regions may vary widely from embodiment to embodiment.

The input device (100) may utilize any combination of sensor components and sensing technologies to detect user input in the sensing region (120). The input device (100) includes one or more sensing elements for detecting user input. As a non-limiting example, the input device (100) may use capacitive techniques.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitance sensing elements to create electric fields. In some capacitive implementations, separate sensing elements may be ohmically shorted together to form larger sensor electrodes.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments, the reference voltage may be system ground. Measurements acquired using absolute capacitance sensing methods may be referred to as absolute capacitance measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling.

In one implementation, a mutual capacitance sensing method operates by detecting the capacitive coupling between one or more transmitter sensor electrodes (also "transmitter electrodes" or "transmitter", TX) and one or more receiver sensor electrodes (also "receiver electrodes" or "receiver", RX). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes and receiver sensor electrodes may both be modulated. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

The absolute capacitance measurements and/or the mutual capacitance measurements may be used to determine when at least one input object is in a sensing region, determine signal to noise ratio, determine positional information of an input object, identify a gesture, determine an action to perform based on the gesture, a combination of gestures or other information, and/or perform other operations.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system may include circuitry for mutual and/or absolute capacitance sensing. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as driving haptic actuators, etc.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g., to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

In some embodiments, the input device (100) includes a touch screen interface, and the sensing region (120) overlaps at least part of an active area of a display screen (155). For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), microLED, liquid crystal display (LCD), or other display technology.

While FIG. 1 shows a configuration of components, other configurations may be used without departing from the scope of the invention. For example, various components may be combined to create a single component. As another example, the functionality performed by a single component may be performed by two or more components.

Figure 2:
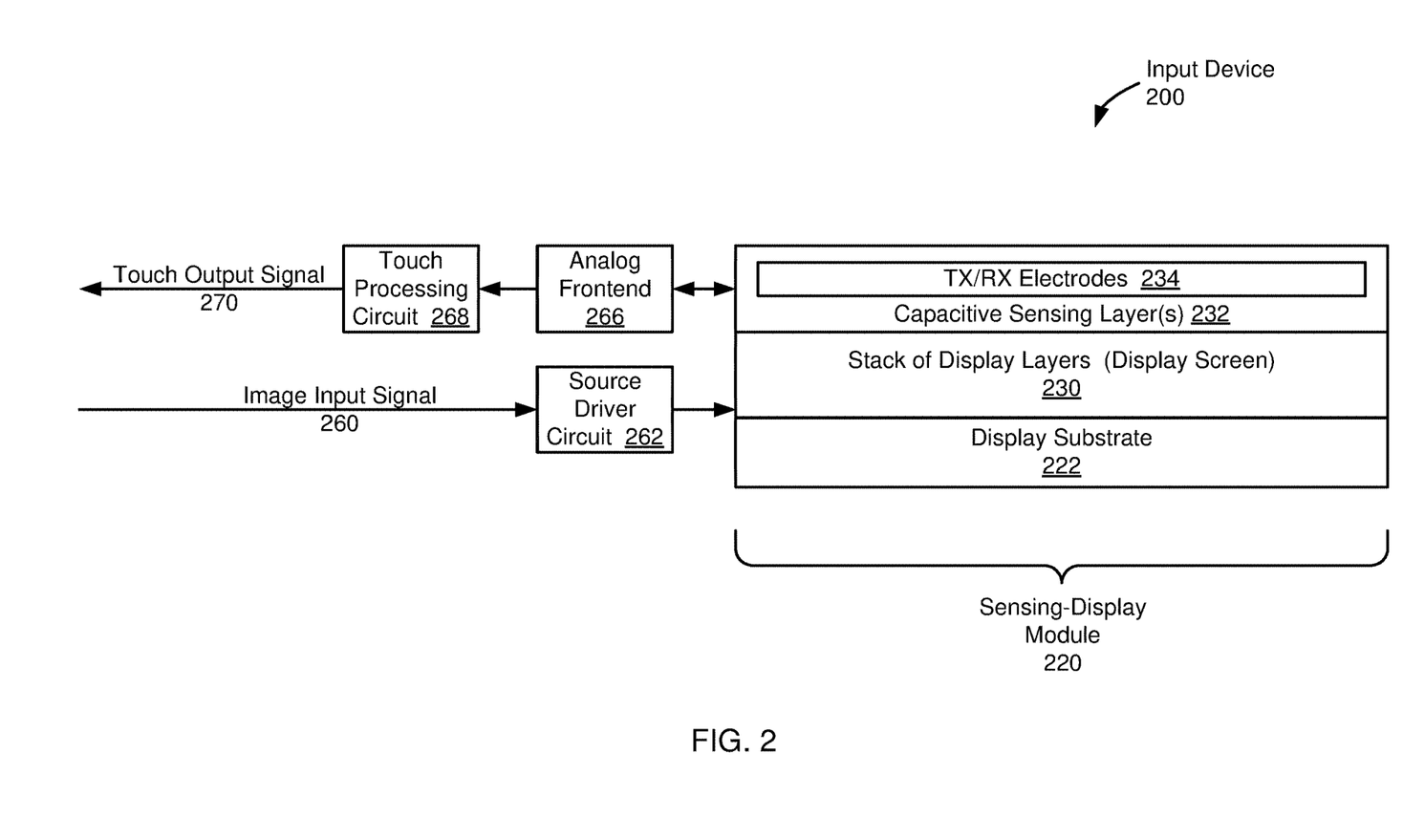
FIG. 2 shows a block diagram of an input device, in accordance with one or more embodiments.

FIG. 2 shows an input device (200) in accordance with one or more embodiments. As shown in FIG. 2, the input device (200) includes a sensing-display module (220). The sensing-display module (220) may implement all or a part of the sensing region (120) and all or a part of the display screen (155), discussed above in reference to FIG. 1.

In one or more embodiments, the sensing-display module (220) includes multiple layers including a stack of display layers (230), one or more capacitive sensing layers (232), and a display substrate (222). The display layers (230) form a display screen. In one embodiment, the display screen is an OLED display. Accordingly, the stack of display layers (230) may include OLED display layers such as an organic emissive layer, an anode layer, a cathode layer, one or more conductive layers which may include a thin-film transistor (TFT) layer, etc. The stack of display layers (230) may be disposed on the display substrate (222). In one embodiment, the display substrate (222) is a flexible plastic substrate, to enable a flexible, rollable and/or foldable OLED display.

The stack of display layers (230) may include microLED layers such as a layer of LEDs disposed on a thin-film transistor (TFT) layer on the display substrate (222).

The stack of display layers (230) may include LCD display layers such as a color filter glass layer, a liquid crystal layer, and a TFT layer disposed on the display substrate (222), which may be glass.

The sensing-display module (220) may have additional layers and components. In one or more embodiments, multiple transmitter (TX) and/or receiver (RX) electrodes (234) are disposed in the one or more capacitive sensing layers (232) in a sensing region of the display screen. The sensing region may span all or part of the display screen. The TX and/or RX electrodes (234) may be used in capacitance sensing (e.g., absolute capacitance sensing, mutual capacitance sensing, etc.). While in FIG. 2, the capacitive sensing layer(s) (232) are shown as being disposed on top of the stack of display layers (230), those skilled in the art will appreciate that these layers may be located anywhere, relative to the stack of display layers (230). In one or more embodiments, the sensing module (220) includes a matrix pad sensor with numerous sensing pads and traces connecting to the sensing pads in a metal mesh layer across the sensing region. The matrix pad sensor may include at least one such metal mesh layer.

In one or more embodiments, the TX and RX electrodes, together, implement mutual capacitance sensing. In other words, a waveform is driven onto the TX electrodes and a resulting signal(s) is received from the RX electrodes. The resulting signal is a function of the waveform and change in capacitance between the TX electrodes and RX electrodes due to the presence of an input object.

In one or more embodiments, the RX electrodes are operated to perform absolute capacitance sensing independent of the TX electrodes. In one or more embodiments, the TX electrodes are operated to perform absolute capacitance sensing independent of the RX electrodes.

In one or more embodiments, a source driver circuit (262) drives the transistors controlling the pixels of the display screen. Each of the pixels may include an OLED pixel, a microLED pixel, an LCD pixel, etc. The source driver circuit (262) may receive an image input signal (260) from a host application processor (e.g., a video processor), or any other component (not shown) that provides image content to be displayed on the display screen (155). The received image signal may be in digital form. The source driver circuit (262) may generate analog signal to drive the transistors associated with the pixels of the display screen, based on the image input signal (260). In one or more embodiments, the pixels of the display screen are driven line-by-line, by the source driver circuit (262). The driving may cause display noise, as discussed below in reference to FIGS. 3 and 4.

In one or more embodiments, an analog frontend (266) may drive electrodes (234) (e.g., the TX electrodes or a subset of the TX electrodes), and may receive resulting signals from electrodes (234) (e.g., from the RX electrodes or a subset of the RX electrodes), to determine the presence and/or position of an input object (e.g., input object (140), discussed above in reference to FIG. 1). The analog frontend (266) may be configured to perform the capacitance sensing by driving the electrodes, receiving the resulting signals, and analog-to-digital converting the resulting signals. The digital processing may be performed elsewhere, by a touch processing circuit (268), e.g., a microprocessor, digital signal processor, etc. The touch processing circuit (268) may output a touch output signal (270) indicating, for example, the coordinates of a detected touch. Depending on the configuration, the circuit elements related to performing capacitive sensing (e.g., the analog frontend (266) and the touch processing circuit (268)) may correspond to the processing system (110) in FIG. 1.

Figure 3:
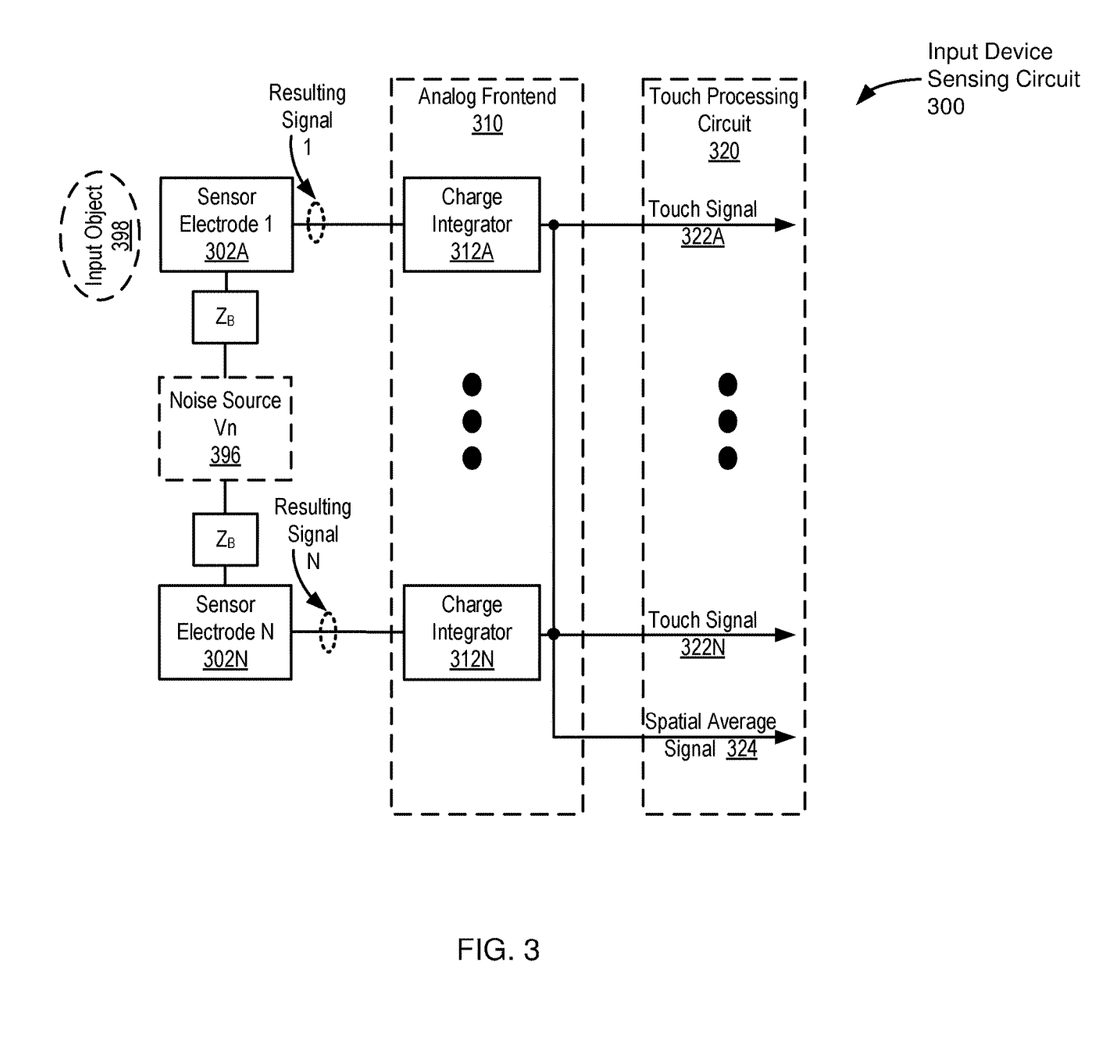
FIG. 3 shows a block diagram of an input device sensing circuit, in accordance with one or more embodiments.

Turning to FIG. 3, an input device sensing circuit (300), in accordance with one or more embodiments, is shown. The input device sensing circuit may be used for a proximity sensing, e.g., a touch sensing.

Various elements introduced in FIG. 3 may correspond to elements shown in FIG. 2. The input device sensing circuit (300) includes multiple touch sensor electrodes (e.g., sensor electrode 1 (302A)—sensor electrode N (302N)), an analog frontend (310) with multiple charge integrators (e.g., charge integrator 1 (312A)—charge integrator N (312N)), and a touch processing circuit (320).

The multiple sensor electrodes (302A-302N) may be used to perform any type of capacitive sensing (e.g., absolute capacitance sensing, trans-capacitance sensing, etc.). The sensor electrodes (302A-302N) may be driven by a modulation voltage (not shown), and the output of each sensor electrode (302A-302N) is a resulting signal (e.g., resulting signal 1—resulting signal N) which reflects the presence of an input object, if any, proximate to the capacitive sensor electrode (302A-302N).

In one or more embodiments, input device sensing circuit (300) includes a noise source (396). The noise source (396) may be associated with the display screen (155). Accordingly, the noise source (396) may be a display noise source. The noise emitted by the noise source (396) may be caused by the driving of the pixels of the display screen (155). A description of such display noise is provided below in reference to FIG. 4.

As shown in FIG. 3, the noise source (396) couples to the touch sensor electrodes (302A-302N). In other words, the resulting signal (e.g., resulting signal 1—resulting signal N) from each sensor electrode (302A-302N) may include some component of the noise (Vn) of the noise source (396). In one or more embodiments, the coupling between the display noise source (396) and each sensor electrode (302A-302N) may be modeled as impedance $Z_B$. The degree to which the coupling between the display noise source (396) and the sensor electrodes (302A-302N) occurs may be a function of various factors. For example, the coupling may be particularly strong when the sensor electrodes (302A-302N) are in close proximity to the display noise source (396), e.g., in OLED touch displays.

In one or more embodiments, the noise (Vn) affects some or all of the sensor electrodes 1-N (302A-302N). In one embodiment, the noise (Vn) may affect the sensor electrodes 1-N (302A-302N) in a similar manner. Accordingly, the resulting signals 1-N may include a spatial common mode, reflecting the noise (Vn). The common mode is spatial because the common mode may be present on the resulting signals 1-N regardless of the spatial location of the corresponding sensor electrodes (302A-302N). For example, assume that the sensor electrodes (302A-302N) are distributed over the surface of a screen (e.g., an LED or LCD screen). In this example, the spatial common mode is a result of the same or similar Vn coupling into the resulting signals 1-N of the sensing electrodes (302A-302N).

As discussed above, the input device sensing circuit (300) includes multiple charge integrators (312A-312N). One separate charge integrator may be assigned to each of the sensor electrodes (302A-302N). Each of the charge integrators (312A-312N) may integrate the resulting signal (1-N) to obtain a touch signal (322A-322N), which may be indicative of a presence or absence of an input object (398) proximate to the corresponding electrode (302A-302N). A spatial average signal (324) may further be obtained for the touch signals (322A-322N). Unlike the touch signals (322A-322N) which fluctuate with the local presence of the input object (398), the spatial average signal (324) is primarily sensitive to spatial common modes, e.g., the noise Vn. Local changes (e.g., the presence of the input object (398) only minimally affect the spatial average signal (324). Various aspects of the common mode are more fully described in U.S. patent application Ser. No. 16/373,369, the full disclosure of which is incorporated herein by reference. Specifically, U.S. patent application Ser. No. 16/373,369 describes common mode noise that may be display noise.

In one or more embodiments, the noise (Vn) affects only a few or a single sensor electrode 1-N (302A-302N). This may be the case, for example, for noise that is coupled into a sensor electrode via an input object in proximity to the sensor electrode. In FIG. 3, noise may be coupled into a sensor electrode between the input object (398) and sensor electrode 1 (302A), for example, for power supply noise, battery charger noise, or other environmental noise. Accordingly, to isolate this type of noise, the touch signal (e.g., touch signal (322A)) rather than the spatial average signal (324) may be relied upon.

Figure 4:
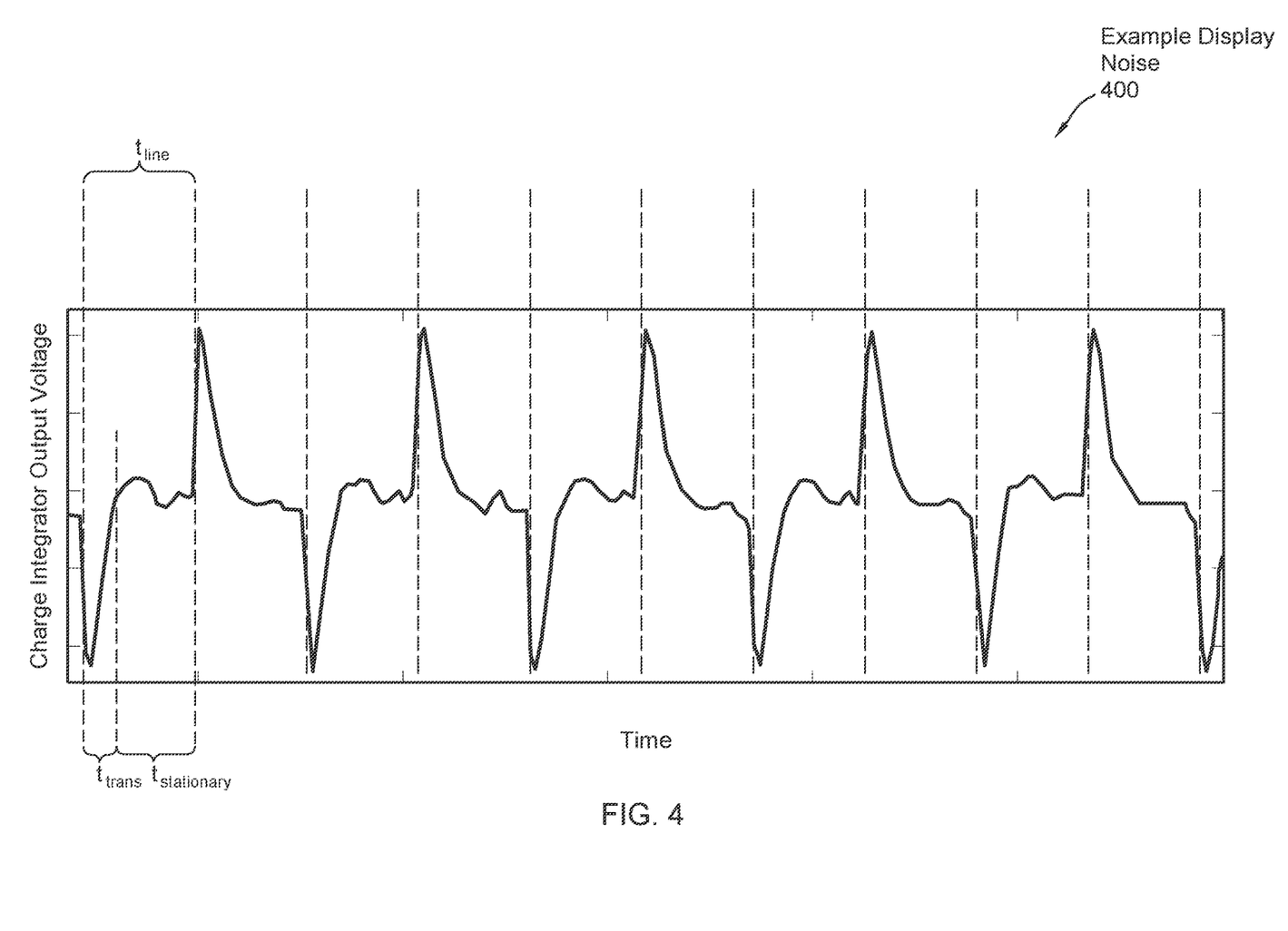
FIG. 4 shows an example of display noise, in accordance with one or more embodiments.

Turning to FIG. 4, an example of display noise in accordance with one or more embodiments is shown. The example display noise (400) was obtained while the display screen (155) was displaying an alternating pattern of black and white lines. In the example, of FIG. 4, assume that the display screen (155) is an OLED display. The OLED display may have a refresh rate of 150-350 kHz, for example, 200 kHz or 250 kHz. Accordingly, each line of the OLED display may be driven during a time interval, $t_{line}$, of 5 or 4 µs, respectively. To obtain a good image quality, a maximum duration of the time interval, $t_{line}$, may be used to drive the LEDs to emit light at a relatively constant level. For each line of the OLED display, the time during which the LEDs emit light at a relatively constant level is defined as $t_{stationary}$, in FIG. 4. $t_{stationary}$, in the example display noise (400) is preceded by $t_{trans}$. $t_{trans}$ is a transition time, during which the cathode layer is responding to an abrupt change in the source driver voltages. With a reduced $t_{trans}$, $t_{stationary}$ is longer. Therefore, minimizing $t_{trans}$ and maximizing $t_{stationary}$ may be a goal in order to maximize the image quality of the display screen (155). However, with less time available for the cathode electrode to settle, the noise bandwidth may increase as a result of the faster response. Relatively little noise may be emitted during $t_{stationary}$, when voltages are relatively constant. Because the emitted noise may affect the proximity sensing, avoiding $t_{trans}$ may be a goal when performing a proximity sensing. Methods for avoiding $t_{trans}$ when performing the proximity sensing are described below.

Note that the trace shown in the example (400) represents a voltage. More specifically, the trace corresponds to the spatial average signal (324) in the input device sensing circuit (300) of FIG. 3. The spatial average signal (324) is a result of driving of the LED's line-by-line. Broadly speaking, the spatial average signal (324) reflects the currents associated with the driving of the LEDs, after a high-pass filtering through one of the layers, e.g., the cathode layer, of the display screen. The high-pass filtering occurs because the cathode layer is located between the one or more conductive layers where the display noise emissions originate, and the capacitive sensing layer with the sensing electrodes. The cathode layer may thus form an electrical shield that high-pass filters the effect of the flow of current, as charges are re-distributed over the cathode layer, over time.

As previously noted, the example display noise (400) was obtained for a pattern of alternating black and white lines, displayed by the OLED display screen (155). Assume that a time interval, $t_{line}$, that begins with an upward voltage deflection is associated with a white line, and that a time interval, $t_{line}$, that begins with a downward voltage deflection is associated with a black line. In real-world applications, the deflections may have different amplitudes, for example, depending on the content that is being displayed (in a real-world application, an alternating purely black and purely white lines is highly unlikely). Accordingly, while the upward and downward deflections during $t_{trans}$ may provide timing information for a proximity sensing, the trace representing the display noise may not be directly used to reliably trigger the proximity sensing due to the display noise being irregular. Specifically, while upward and downward deflections may typically only occur at specific times, governed by the horizontal refresh rate of the display screen (155), individual up/downward deflections may have varying amplitudes, or may not occur at all.

However, even in presence of these irregularities, a regular pulse signal may be synchronized onto the display noise, and the pulse signal may subsequently be used to time the proximity sensing in order to avoid $t_{trans}$ when performing the proximity sensing. The synchronization to the display noise is a soft-synchronization because the synchronization is performed based on a processing of the display noise, instead of using an explicitly provided synchronization signal for the display.

Figure 5:
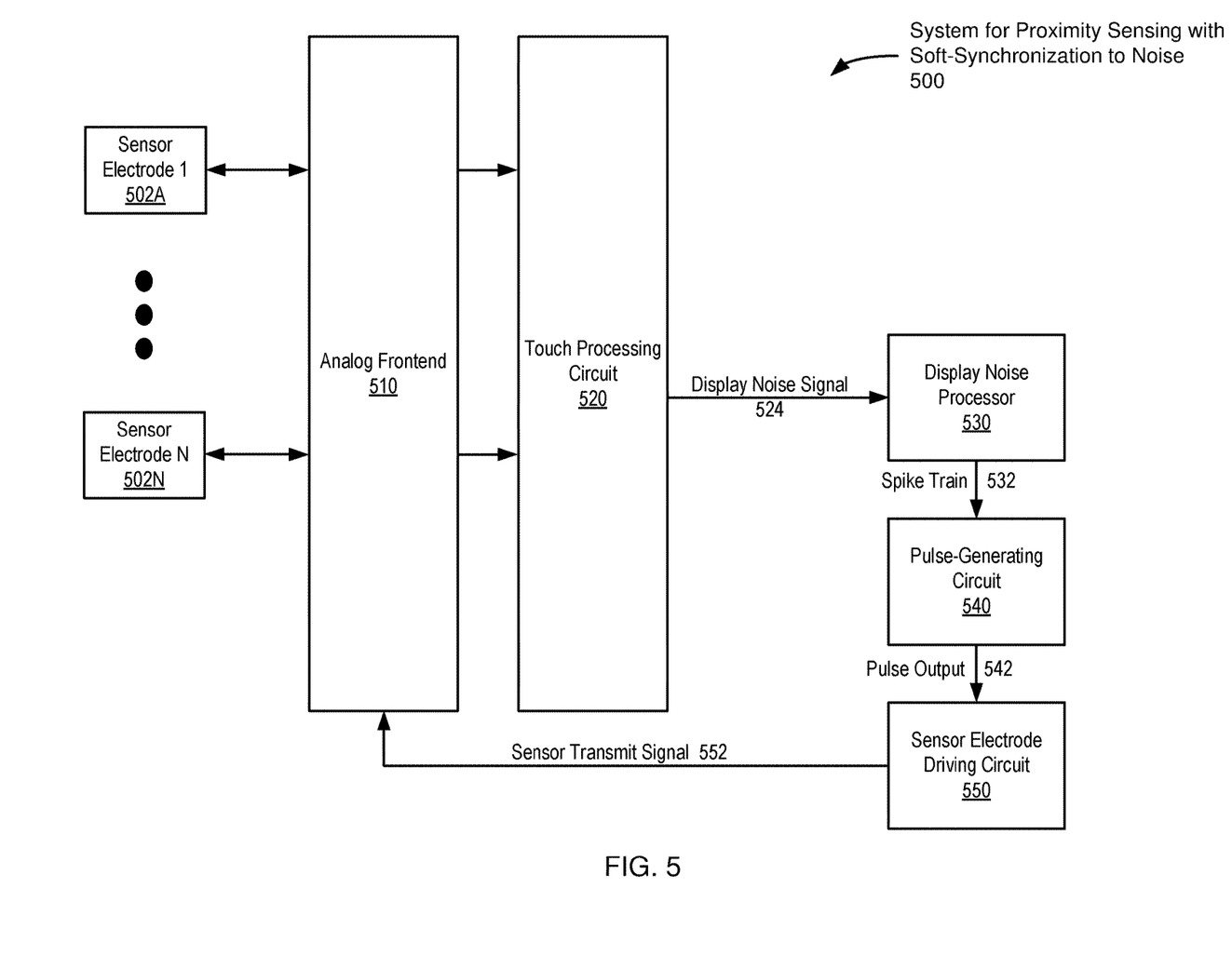
FIG. 5 shows a block diagram of a system for proximity sensing with soft-synchronization to noise, in accordance with one or more embodiments.

Turning to FIG. 5, a system for proximity sensing with soft-synchronization to mitigate noise (500) is shown. The system (500) includes various previously described components such as the sensor electrodes (502A-502N), the analog frontend (510), and the touch processing circuit (520). In one or more embodiments, the touch processing circuit (520) outputs a display noise signal (524). The display noise signal (524) may be similar to the example display noise as described in reference to FIG. 4. Because display noise tends to affect multiple or all sensor electrodes in a sensing region, the display noise signal (524) may be obtained as a spatial average signal (324) as shown in reference to FIG. 3.

Figure 6:
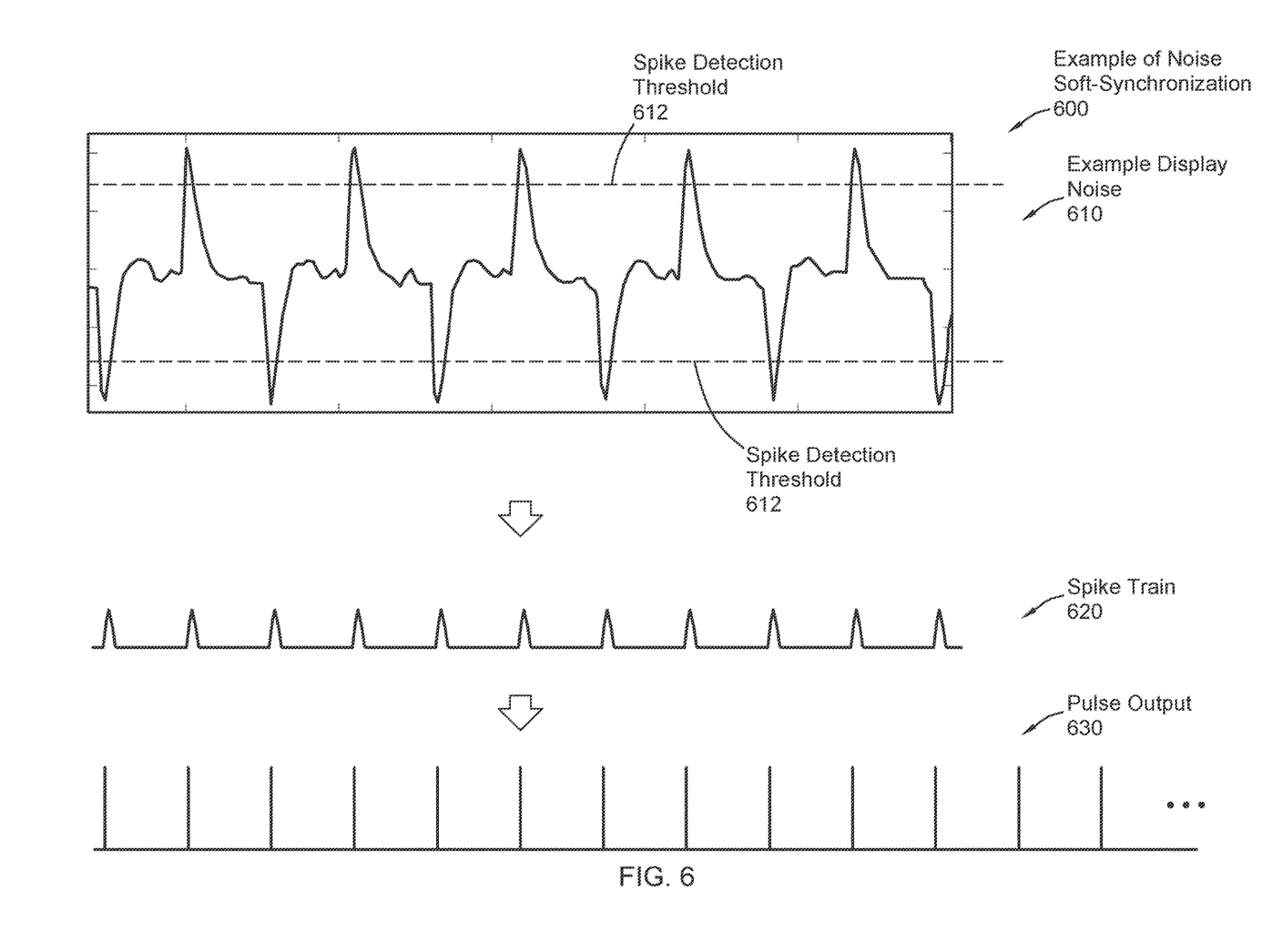
FIG. 6 shows an example of a soft-synchronization to noise, in accordance with one or more embodiments.

The display noise signal (524), in one or more embodiments, is processed by a display noise processor (530). The display noise processor is configured to extract a spike train (532) in the display noise signal (524). The spike train (532) may be obtained by rectifying the display noise signal (524). The rectification may be an operation that produces an absolute value of the display noise signal (524). In one embodiment, the rectification is performed by first subtracting a reference voltage from the display noise signal (524), and then taking the absolute value, after the subtraction. The reference voltage may be a baseline when no signal is present in the display noise signal. Subsequently, the display noise signal (524) may be thresholded. As a result, the spike train contains spikes, where the rectified, thresholded display noise signal exceeds a specified threshold, used for the thresholding. The spike detection threshold, used for the thresholding, may be selected such that spikes of a certain amplitude reliably exceed the spike detection threshold, while other events that are not necessarily associated with the upward and downward deflections during $t_{trans}$ remain sub-threshold. An example of the resulting spike train is shown in FIG. 6, described below. The display noise processor (530) may include analog and/or digital components. Accordingly, the rectification and the thresholding of the display noise signal (524) may be performed in the analog and/or digital domain. In one embodiment, the display noise signal (524) is analog-to-digital converted, and the operations of the display noise processor (530) are performed in the digital domain.

The spike train (532), in one or more embodiments, is processed by a pulse-generating circuit (540). The pulse-generating circuit (540) is configured to synchronize a pulse output (542) to the spike train (532). An example of the pulse output (542) is shown in FIG. 6, described below. As previously noted, and now referring to the example display noise (400) of FIG. 4, upward and downward deflections, associated with the driving of the LEDs of a line of the display screen are not always necessarily present in the noisy sensor signal. Accordingly, the spike train may also not necessarily include regularly spaced spikes, with one spike appearing for each line of the display screen. However, once synchronized, the pulse output (542) may provide a stable timing signal that may directly correspond to a horizontal synchronization signal of the display screen. In other words, each of the pulses of the pulse output (542) may be indicative of LEDs of a line of the display screen being driven by the source driver circuit. When the pulses of the pulse output (542) are temporally aligned with the spikes of the spike train (532), each of the pulses may approximately fall into the time interval $t_{trans}$, as described in reference to FIG. 3.

The pulse-generating circuit (540) may include analog and/or digital components. Accordingly, synchronization of the pulse output (542) to the spike train (532) may be performed in the analog and/or digital domain. In one embodiment, the pulse-generating circuit (540) is digitally implemented. In one embodiment, the pulse-generating circuit includes a phase-locked loop (PLL) or a delay-locked loop. The PLL may be based on a digital phase detector (e.g., using an XOR gate). The PLL may be preconfigured with a seed frequency, e.g., using the horizontal synchronization frequency of the display screen.

The pulse-generating circuit (540) may provide a status output to indicate whether sufficient display noise is present to derive the pulse output, and/or whether the pulse-generating circuit is free-running or currently locked to the display noise signal. When a lock has not been achieved, i.e., the pulse output is not synchronized to the spike train, the proximity sensing may be paused to avoid an erroneous proximity sensing output.

The pulse output (542), in one or more embodiments, serves as an input to a sensor electrode driving circuit (550). The sensor electrode driving circuit (550) is configured to generate a sensing signal to be emitted by one or more of the sensor electrodes (502A-502N) to perform a capacitive proximity sensing. The sensing signal may be, for example, a burst including a sine wave, a square wave, etc. In one or more embodiments, based on the pulse output (542) providing a timing signal, the sensor electrode driving circuit (550) provides the sensing signal to one or more of the sensor electrodes (502A-502N) at a point in time when an interference by the display noise is reduced or avoided. Referring to FIG. 4, the sensing signal may be emitted during $t_{stationary}$. The exact point in time when the sensor electrode driving circuit (550) triggers the emission of the sensing signal may be tunable, to minimize interference by the display noise. In other words, a tunable delay between a pulse of the pulse output (542), and the emission of the sensing signal may be implemented by the sensor electrode driving circuit (550).

While one particular configuration of the system for proximity sensing with soft-synchronization to noise (500) is shown, systems for proximity sensing may include various other components that are not shown in FIG. 5, without departing from the disclosure. Also, while embodiments of the disclosure were mostly described in context of OLED display technology and metal mesh proximity sensors, systems for proximity sensing may also be used in conjunction with other technologies, such as LCD displays, indium tin oxide (ITO) proximity sensors, etc.

Turning to FIG. 6, an example of a noise soft-synchronization (600), in accordance with one or more embodiments, is shown. The example (600) is based on the example display noise, previously shown in FIG. 4. A spike train (620) is obtained from the example display noise (610). FIG. 6 does not illustrate the rectification of the example display noise (610), and accordingly, two spike detection thresholds (612) are shown to capture spikes associated with upward and downward deflections in the non-rectified example display noise (610). A pulse output (630), generated from the spike train (620), is also shown. The pulse output may be provided by a pulse-generating circuit. As shown in FIG. 6, the pulse output (630) may continue, even when the spike train (620) is interrupted. Specifically, the pulse-generating circuit may continue to produce pulses, based on the pulse-generating circuit's internal clock. While the internal clock may not be entirely accurate, drift is not a problem, because an occasionally detected spike of the spike train (620) is sufficient to re-synchronize the pulse output, thereby eliminating any potential small drift that may have accumulated over a time interval when no spikes were available.

Figure 7:
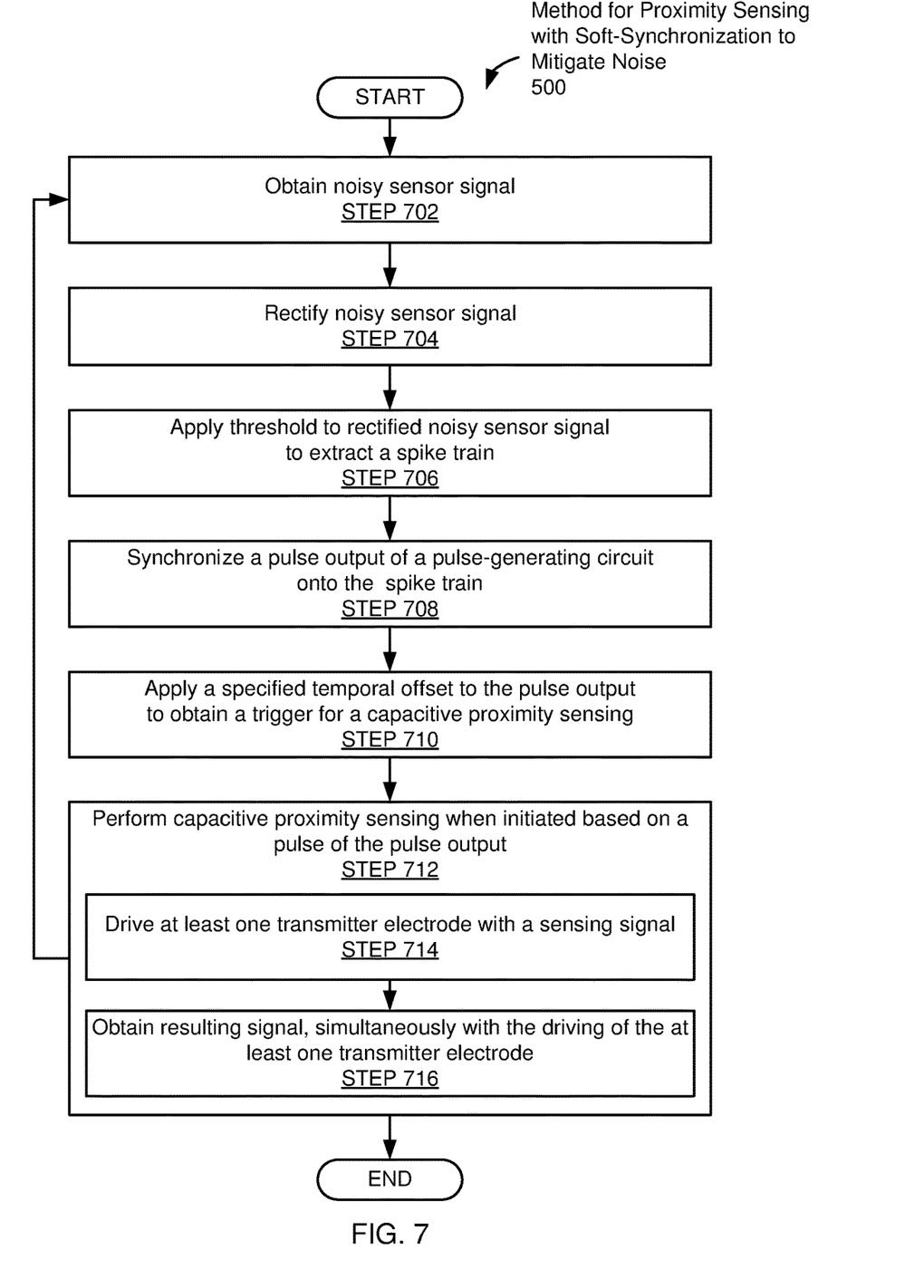
FIG. 7 shows a flowchart in accordance with one or more embodiments.

FIG. 7 shows a flowchart in accordance with one or more embodiments. While the various steps in the flowchart are presented and described sequentially, one of ordinary skill will appreciate that some or all of the steps may be executed in different orders, may be combined or omitted, and some or all of the steps may be executed in parallel. Additional steps may further be performed. Accordingly, the scope of the disclosure should not be considered limited to the specific arrangement of steps shown in FIG. 7.

The flowchart of FIG. 7 depicts a method of proximity sensing with soft synchronization to noise. One or more of the steps in FIG. 7 may be performed by the components discussed above in reference to FIGS. 1, 2, 3, and 5.

In Step 702, a noisy sensor signal is obtained. In one or more embodiments, the steps of FIG. 7 are repeatedly executed, e.g., in a loop, and the noisy sensor signal may thus be obtained from a prior sensing operation (e.g., from a previous execution of Step 712).

In one embodiment, the noisy sensor signal is affected by display noise. Display noise, as previously discussed, may be captured by multiple or all sensor electrodes in the sensing region. Accordingly, the noisy sensor signal may be a spatial average signal, as previously described in reference to FIG. 3.

In one embodiment, the noisy sensor signal is affected by power supply or battery charger noise. As previously discussed in reference to FIG. 3, power supply noise and/or battery charger noise primarily affects sensor electrodes that are in proximity to an input object. Accordingly, in such a scenario, the touch signal of the sensor electrode(s) in proximity to the input object, instead of the spatial average signal may be used as the noisy sensor signal.

In Step 704, the noisy sensor signal is rectified, as previously discussed in reference to FIGS. 5 and 6.

In Step 706, a thresholding operation is performed to extract a spike train in the rectified noisy sensor signal, as previously discussed in reference to FIGS. 5 and 6.

In Step 708, a pulse output of a pulse-generating circuit is synchronized onto the spike train. The synchronizing onto the spike train is part of the operation of the pulse-generating circuit, as previously described in reference to FIGS. 5 and 6.

In Step 710, a specified temporal offset is applied to the pulse output of the pulse-generating circuit, to obtain a trigger for a capacitive proximity sensing. A capacitive proximity sensing may, thus, be initiated by a pulse of the pulse output.

In Step 712, the capacitive proximity sensing is performed when initiated. The capacitive proximity sensing includes the execution of Steps 714 and 716.

In Step 714, a sensing signal is emitted on one or more of the sensor electrodes, and in Step 716, simultaneously with the emission of the sensing signal, a resulting signal is obtained from one or more of the sensor electrodes. The details of the execution of Steps 714 and 716 may depend on what type of sensing is performed (e.g., an absolute capacitance sensing or a transcapacitance sensing), as previously described. The obtained resulting signal may subsequently undergo additional processing to determine whether a touch has occurred, to determine the location of the touch, etc.

Additional details regarding Steps 702-716 are provided with regard to FIGS. 1-6, where the corresponding components and possible variations of the steps are described.

Based on the execution of the method of FIG. 7, a proximity sensing may be performed in presence of noise such as display noise, power supply noise, and/or battery charger noise. The effect of the noise on the proximity sensing may be reduced by soft-synchronizing the proximity sensing to the noise signal such that there is no or reduced temporal overlap between the strongest noise emissions and the proximity sensing. Embodiments of the disclosure may thus avoid the issue of having to discard proximity sensing samples that have been corrupted by noise. Due to the soft-synchronization, no synchronization signal, e.g., provided via a synchronization signal wire from the display screen, is needed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An input device, comprising:
   a capacitive proximity sensor comprising a plurality of transmitter electrodes and a plurality of receiver electrodes for proximity sensing in a sensing region;
   a processing system configured to:
      obtain a noisy sensor signal from the capacitive proximity sensor;
      extract a spike train in the noisy sensor signal comprising:
         rectifying the noisy sensor signal to produce an absolute value of the noisy sensor signal; and
         thresholding the noisy sensor signal, after the rectifying;
      synchronize a pulse output of a pulse-generating circuit onto the spike train; and
      initiate a first capacitive proximity sensing based on a first pulse of the pulse output.

2. The input device of claim 1, wherein the first capacitive proximity sensing comprises:
   driving at least one of the plurality of transmitter electrodes with a sensing signal,
   simultaneously with the driving, obtaining a resulting signal from at least one of the plurality of receiver electrodes, and
   process the resulting signal to determine a presence of an input object in the sensing region.

3. The input device of claim 2, wherein initiating the first capacitive proximity sensing based on the first pulse of the pulse output comprises:
   implementing a specified delay, prior to emitting the sensing signal.

4. The input device of claim 1, further comprising:
   a display screen overlapping the sensing region.

5. The input device of claim 4, wherein the display screen is an organic light-emitting diode (OLED) display.

6. The input device of claim 1, wherein the capacitive proximity sensor is a metal mesh sensor.

7. The input device of claim 1, wherein the pulse-generating circuit comprises a phase-locked loop.

8. The input device of claim 1, wherein the noisy sensor signal is a spatial average signal of the plurality of receiver electrodes.

9. The input device of claim 1, wherein the noisy sensor signal is a touch signal obtained from one of the plurality of receiver electrodes in proximity to the input object.

10. The input device of claim 1, further comprising:
determining that the pulse output is not synchronized to the spike train; and
based on the determination:
preventing performing a second capacitive proximity sensing.

11. A processing system, comprising:
circuitry configured to:
obtain a noisy sensor signal from a capacitive proximity sensor interfacing with the circuitry of the processing system,
wherein the capacitive proximity sensor comprises a plurality of transmitter electrodes and a plurality of receiver electrodes for proximity sensing in a sensing region;
extract a spike train in the noisy sensor signal comprising:
rectifying the noisy sensor signal to produce an absolute value of the noisy sensor signal, and
thresholding the noisy sensor signal, after the rectifying;
synchronize a pulse output of a pulse-generating circuit onto the spike train; and
initiate a first capacitive proximity sensing based on a first pulse of the pulse output.

12. The processing system of claim 11, wherein the pulse-generating circuit comprises a phase-locked loop.

13. A method of operating an input device, comprising:
obtaining a noisy sensor signal from a capacitive proximity sensor;
extracting a spike train in the rectified noisy sensor signal comprising:
rectifying the noisy sensor signal to produce an absolute value of the noisy sensor signal, and
thresholding the noisy sensor signal, after the rectifying;
synchronizing a pulse output of a pulse-generating circuit onto the spike train; and
initiating a first capacitive proximity sensing based on a first pulse of the pulse output.

14. The method of claim 13, wherein the first capacitive sensing comprises:
driving at least one transmitter electrode of the capacitive proximity sensor with a sensing signal;
simultaneously with the driving, obtaining a resulting signal on at least one receiver electrode of the capacitive proximity sensor; and
processing the resulting signal to determine a presence of an input object at the capacitive proximity sensor.

15. The method of claim 13, wherein initiating the first capacitive proximity sensing based on the first pulse of the pulse output comprises:
implementing a specified delay, prior to emitting the sensing signal.

16. The method of claim 13, wherein the noisy sensor signal is a spatial average signal of a plurality of electrodes of the capacitive proximity sensor.

17. The method of claim 13, wherein the noisy sensor signal is a touch signal obtained from a receiver electrode in proximity to the input object.

18. The method of claim 13, further comprising:
determining that the pulse output is not synchronized to the spike train; and
based on the determination:
preventing performing a second capacitive proximity sensing.

* * * * *